US012769710B2

(12) United States Patent
Falko

(10) Patent No.: US 12,769,710 B2
(45) Date of Patent: Oct. 20, 2026

(54) SYSTEMS AND METHODS OF MANAGING STATE MACHINE SYSTEMS WITH COMPACTING DISTRIBUTED LOG STORAGE

(71) Applicant: Salesforce, Inc., San Francisco, CA (US)

(72) Inventor: Andrey Falko, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 604 days.

(21) Appl. No.: 17/952,487

(22) Filed: Sep. 26, 2022

(65) Prior Publication Data

US 2024/0104069 A1 Mar. 28, 2024

(51) Int. Cl.
*G06F 16/21* (2019.01)
*G06F 16/28* (2019.01)

(52) U.S. Cl.
CPC .......... *G06F 16/212* (2019.01); *G06F 16/217* (2019.01); *G06F 16/284* (2019.01)

(58) Field of Classification Search
CPC ..... G06F 16/212; G06F 16/217; G06F 16/284
See application file for complete search history.

(56) References Cited

U.S. PATENT DOCUMENTS 9,069,593 B2 6/2015 Falko
9,280,387 B2 3/2016 Falko
9,306,906 B2 4/2016 Fry
10,051,005 B2 8/2018 Fry
10,303,075 B2 5/2019 Tanaka
10,303,586 B1 5/2019 Falko
10,802,951 B2 10/2020 Falko
2007/0038659 A1* 2/2007 Datar .................... G06Q 30/02
2017/0048285 A1* 2/2017 Pearl ........................ G06F 16/11
2017/0078169 A1* 3/2017 Bent .................... H04L 43/0876
2017/0272516 A1* 9/2017 Deakin ............... H04L 67/1095
2018/0075103 A1* 3/2018 Kogan .............. G06F 16/24535
2019/0089371 A1* 3/2019 Ozaki ................. G06F 11/3082
(Continued)

OTHER PUBLICATIONS

Apache Kafka Meets Workflow Engines. Kafka Summit Americas 2021. Sep. 14-15, 2021. https://www.confluent.io/events/kafka-summit-americas-2021/apache-kafka-meets-workflow-engines/.
(Continued)

*Primary Examiner* — Apu M Mofiz
*Assistant Examiner* — Dara J Glasser
(74) *Attorney, Agent, or Firm* — Butzel Long

(57) ABSTRACT

Systems and methods are provided for receiving, at a server, a workflow definition and generating a unique key for the received workflow definition. A distributed log storage may store the internal workflow schema having the not-started states to a state topic of the distributed log storage using the generated unique key, where the state topic includes the states of the internal workflow schema. One or more workers at the server may perform at least one operation based on a received message. The state may be updated at the distributed log storage based on the performed at least one operation. The state topic of the internal workflow schema for the generated key may be compacted based on the updated state, where the compacting reduces the states of the internal workflow schema to the current states, without intermediary states.

21 Claims, 7 Drawing Sheets

(56) References Cited

U.S. PATENT DOCUMENTS

| | | | | |
|---|---|---|---|---|
| 2020/0073781 | A1 | 3/2020 | Falko | |
| 2020/0351091 | A1 * | 11/2020 | Gardner | H04L 9/3213 |
| 2021/0081396 | A1 * | 3/2021 | Tian | G06F 16/1805 |
| 2023/0396673 | A1 * | 12/2023 | Pinczel | G06F 16/27 |

OTHER PUBLICATIONS

Camunda Platform Reference Architecture. Oct. 1, 2021. https://page.camunda.com/camunda-platform-reference-architecture-datasheet.

* cited by examiner

SYSTEMS AND METHODS OF MANAGING STATE MACHINE SYSTEMS WITH COMPACTING DISTRIBUTED LOG STORAGE

BACKGROUND

Presently, workflow engines and other software systems that depend on state machines to track state transitions use relational databases or consensus-based datastores to store the latest states of the state machine. These systems typically require splitting and distributing rows and columns of a database into smaller tables (i.e., sharding) and operational upkeep.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
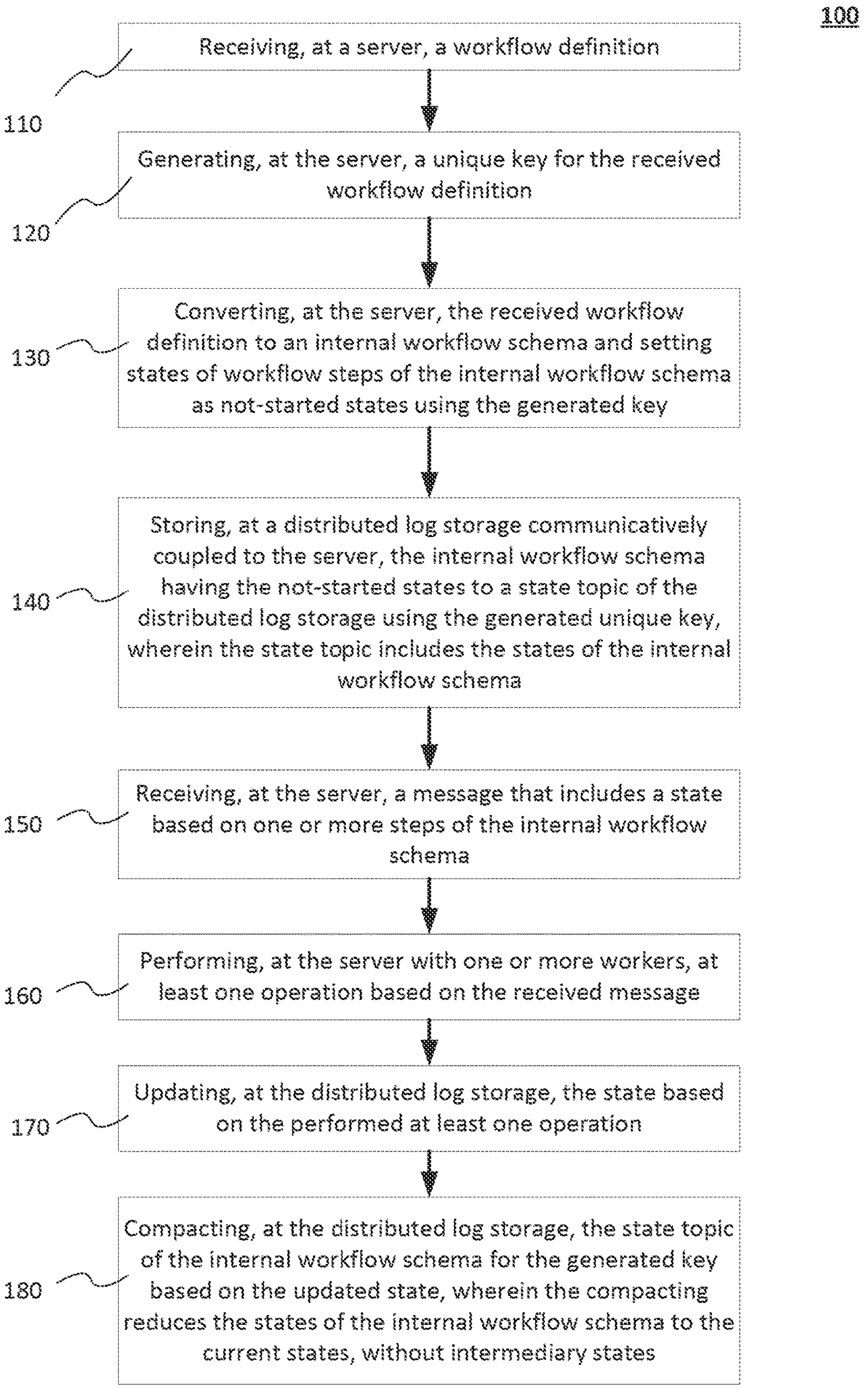
FIG. 1 shows an example method of managing a state machine system with compacting distributed log storage according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide an automatically compacting distributed log storage to track state machine systems. State machines, such as workflow engines, may be used in a variety of systems. For example, workflow engines may process a series of user-defined steps both in parallel and serially that might have inter-dependencies between each other. Each step has states such as not-started, in-progress, error, completed, or the like. Workflow engines may use state machines to track transitions between states so that the workflow engine may determine when to execute, re-try, and/or continue to any follow-up operations.

Presently, workflow engines and other software systems that depend on state machines to track state transitions use relational databases, key-value stores (e.g., a data storage software program that stores data as a set of unique identifiers, each of which have an associated value), or consensus-based datastores to store the latest states of the state machine. Some present workflow systems are continuous integration (CI) systems, and use shared volumes (e.g., elastic block store) to persist state changes. Such CI systems typically store the latest states of the workflow on the shared volume, in addition to the relational databases, key-value stores, and/or consensus-based datastores. Current systems require splitting and distributing rows and columns of a database into smaller tables (e.g., a sharding procedure) and operational upkeep when going beyond a single relational database, shared volume, and disk of consensus datastore notes.

In contrast to current systems, implementations of the disclosed subject matter use a distributed log store with automated compacting to efficiently monitor and manage states of a state machine. That is, current systems that use relational databases or consensus-based datastores need to perform sharding, whereas the distributed log store of the disclosed subject matter uses built-in partitioning to increase throughput and state machine operations without needing to shard. The disclosed subject matter performs log compaction automatically when a state is updated. Compaction may reduce the storage needed for tracking and/or managing states of the state machine.

In implementations of the disclosed subject matter, the distributed log store may have transactional writes so that two or more workers may write a status to the distributed log, so that operations may be executed in parallel.

A key may be generated that is unique for each workflow run. In some implementations, to determine a run number, the state of the state machine may be read to determine if there has already been a run for the first part of the key. A user may select a re-run if the system has already processed the workflow.

Log compaction may be used for replacement of workers for the workflow engine. If workers are no longer active because of a fault (e.g., because of a network failure, machine failure, or the like), a replacement worker may read the state of the state machine. Compacting may allow for the replacement worker to avoid having to read the full log of everything that the workers tracked. That is, the disclosed subject matter compacts the intermediary steps that a workflow went through, and are not read by the replacement worker. Rather, the replacement worker reads the most current state without having to read the earlier states, which have been compacted.

FIG. 1 shows an example method 100 of managing a state machine system with compacting distributed log storage according to an implementation of the disclosed subject matter.

Figure 5:
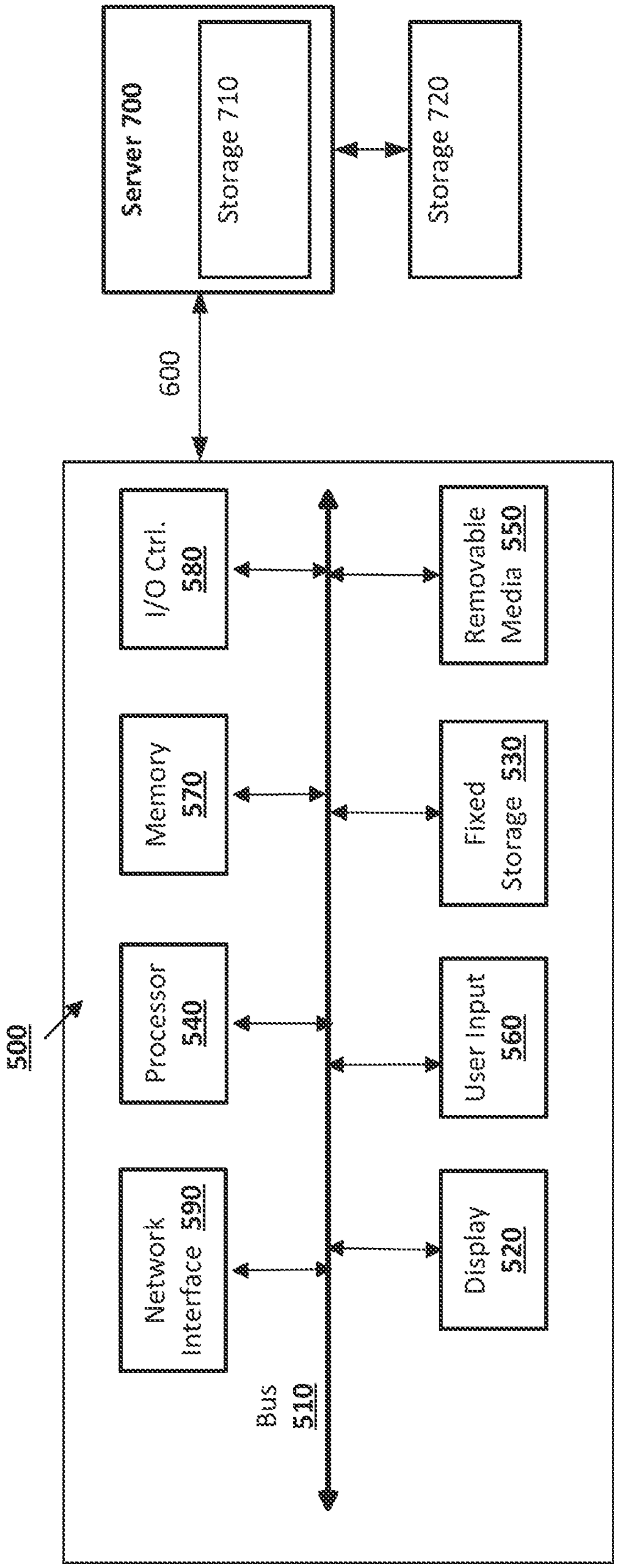
FIG. 5 shows a computer system according to an implementation of the disclosed subject matter.

At operation 110, a server may receive a workflow definition. In some implementations, a server 700 may receive a workflow definition from computer 500 via communications network 600 as shown in FIG. 5. The workflow definition may be a set of defined operations that may be executed serially and/or in parallel with one another. The operations of the workflow definition may have inter-dependencies between one another. The workflow definition may be part of a workflow engine, which may be, for example, a software application that may be executed by the server (e.g., server 700 shown in FIG. 5). In some implementations, the server may validate the received workflow definition.

Figure 4A:
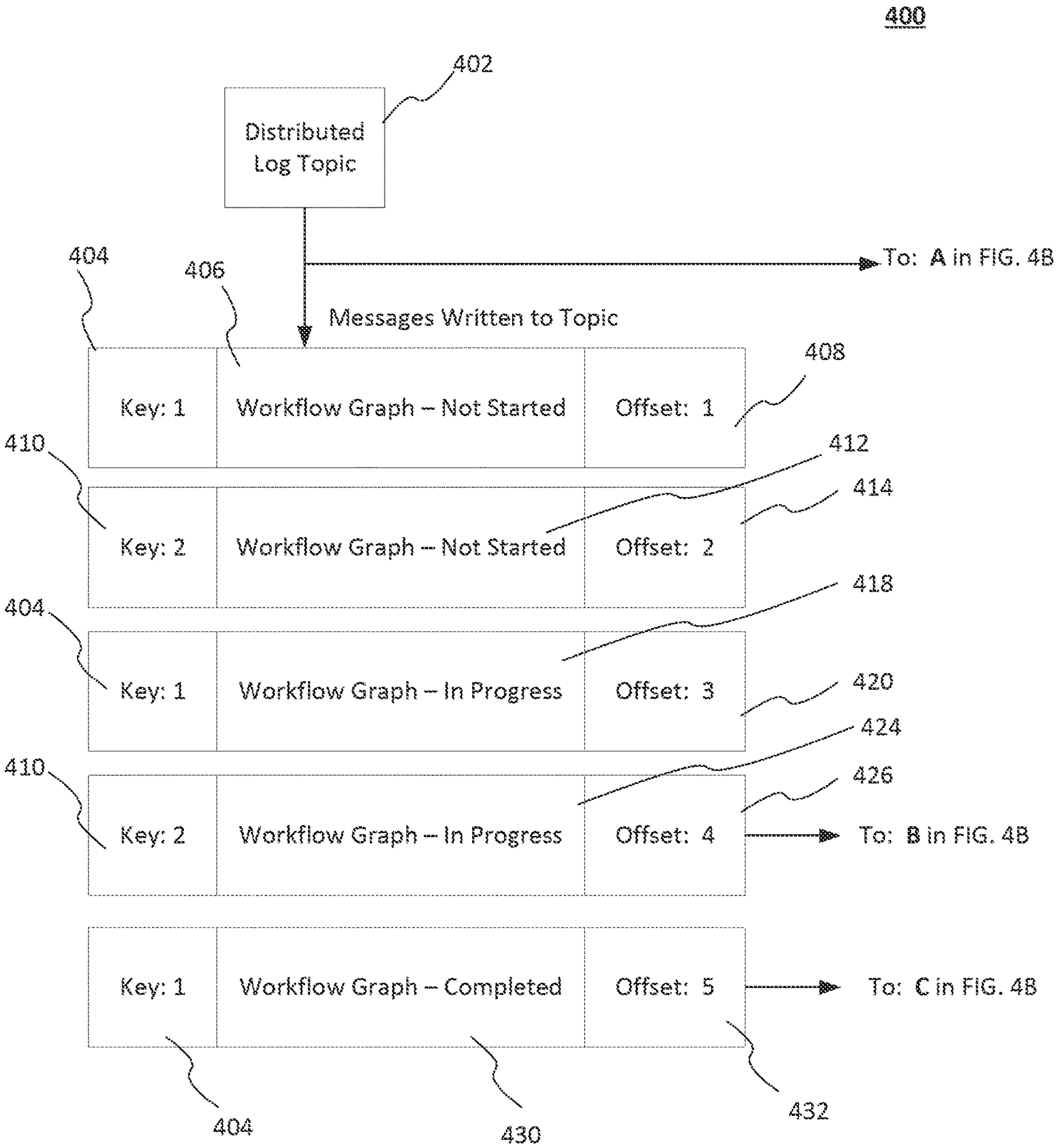
FIGS. 4A-4B show an example of compaction according to an implementation of the disclosed subject matter.
Figure 4B:
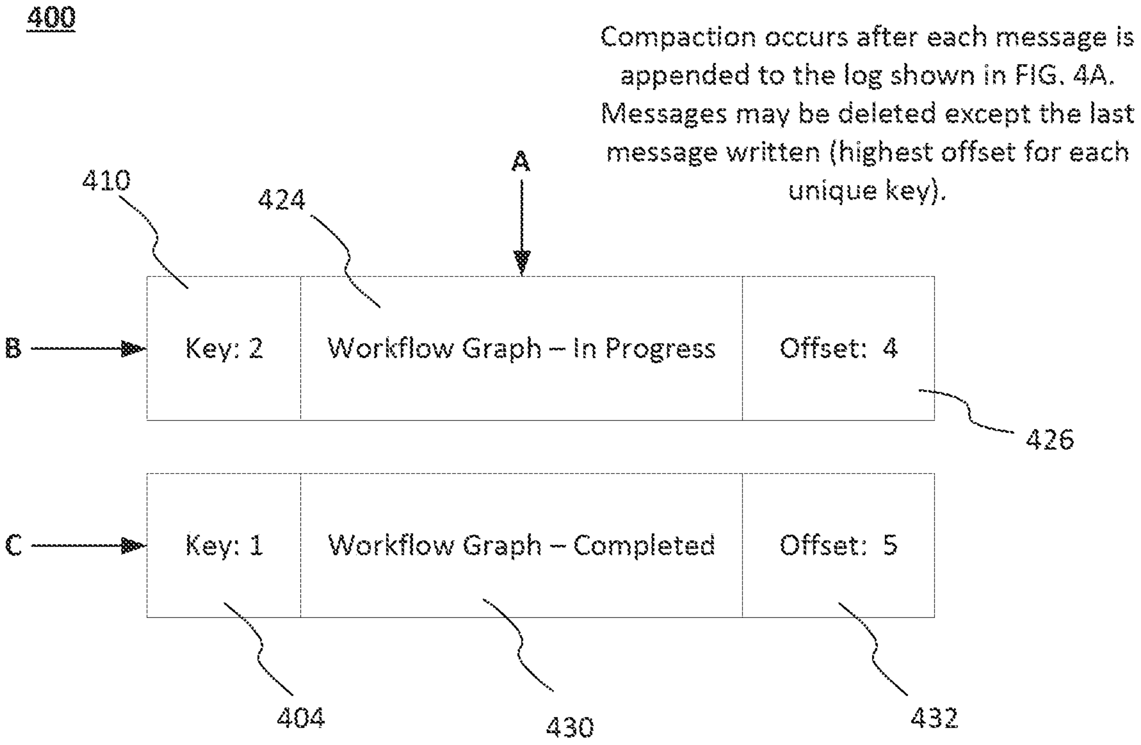

At operation 120, the server may generate a unique key for the received workflow definition. The unique key may be a universally unique identifier (UUID). As shown in FIGS. 4A-4B, each workflow may have a separate unique key (e.g., key 1, key 2, and the like).

In some implementations, the key may be unique for a workflow run. For example, a service hostname may be concatenated by the server with a change identifier (change ID) and a run number to generate the unique key. In some implementations, the server may determine a run number and/or whether to perform a re-run operation, as discussed in detail below.

At operation 130, the server may convert the received workflow definition to an internal workflow schema. For example, the workflow definition may be converted from a first format to a workflow schema that has a second format. The server may set states of workflow operations of the internal workflow schema as not-started states using the generated key. That is, the not-started state may be the initial state of the workflow operations of the internal workflow schema.

The internal workflow schema may include a hold sequential workflow operation, a parallel workflow operation, a nested workflow operation, or the like. In some implementations, the schema may include sequential, parallel, and/or nested workflow operations.

At operation 140 the internal workflow schema having the not-started states may be stored to a state topic of the distributed log storage (e.g., storage 710 and/or storage 720 shown in FIG. 5) using the generated unique key. The state topic may include the states of the internal workflow schema.

At operation 150, the server may receive a message that includes a state based on one or more steps of the internal workflow schema. In some implementations, the server may determine that the state of the received message is not-started, in-progress, error, completed, and/or other suitable state. The not-started state may indicate that the step of the internal workflow schema has not been started by any worker. That is, a worker may begin performing at least one operation. The in-progress state may indicate that a worker has already started performing at least one operation for the internal workflow schema, and other worker may skip performing operations based on the message. The error state may indicate when an error has occurred when the worker is performing at least one operation for the internal workflow schema. When the state of the received message is an error state, a worker of the server may re-try performing the operation from which the error occurred. The state at the distributed log storage may be changed to an in-progress state when the worker retries performing the operation. When the state of the received message is completed, a worker of the server may skip the message, as at least one other worker may be performing an operation in at least one operation for the internal workflow schema.

At operation 160, one or more workers at the server may perform at least one operation based on the received message. The operation may be based on a step of the internal workflow schema for a particular key.

At operation 170, the state may be updated at the distributed log storage based on the performed at least one operation. For example, when the at least one operation is completed by a worker, a completed state is written to the distributed log storage.

At operation 180, the state topic of the internal workflow schema for the generated key may be compacted at the distributed log storage based on the updated state, where the compacting reduces the states of the internal workflow schema to the current states, without intermediary states. For example, FIG. 3B shows the internal workflow schema with compaction, as discussed below. In some implementations, the server may transmit the state topic of the internal workflow schema for display. An example of compaction operation is discussed below in connection with FIGS. 4A-4B.

Figure 3A:
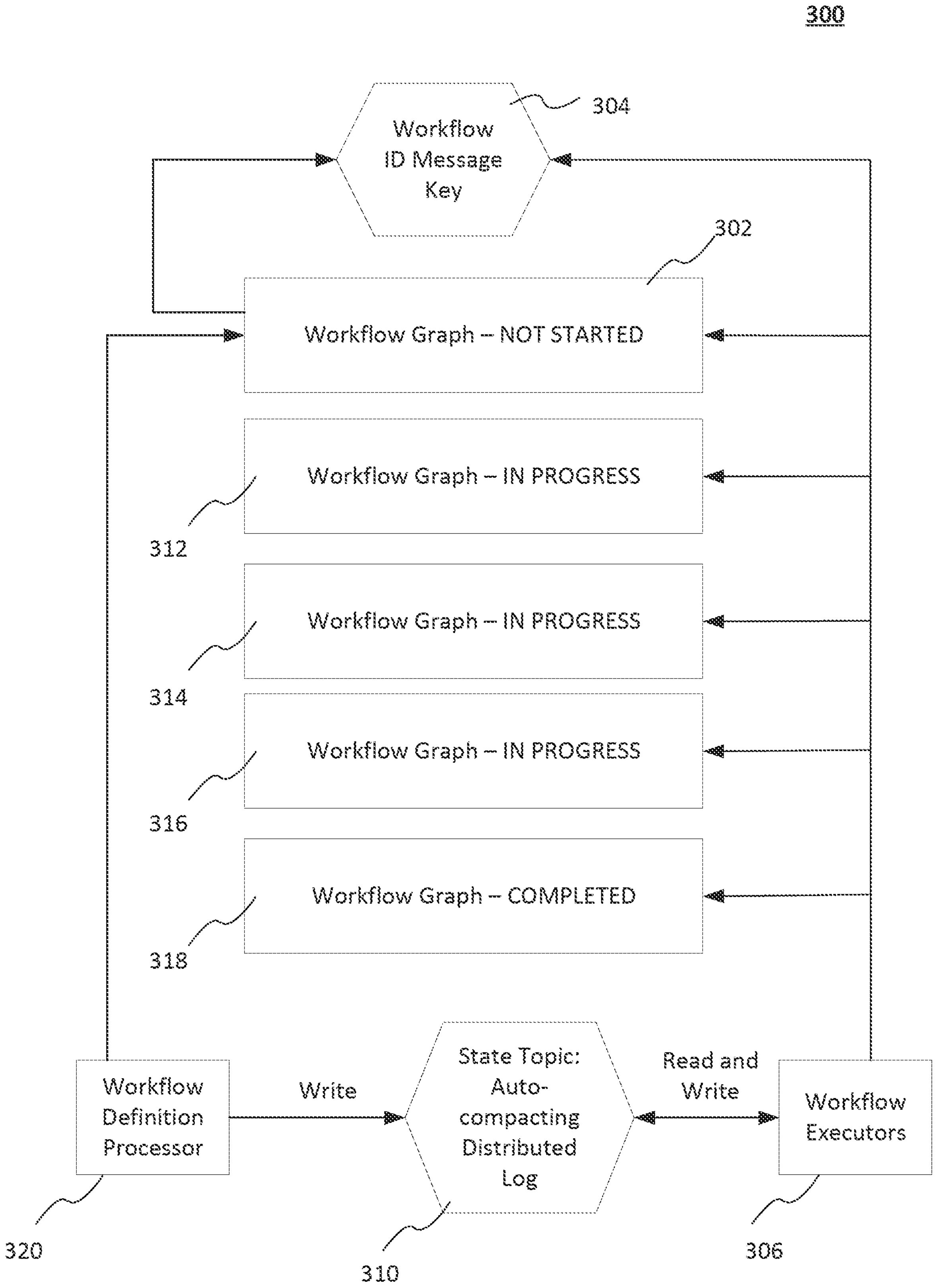
FIG. 3A shows an example workflow without compaction according to an implementation of the disclosed subject matter.
Figure 3B:
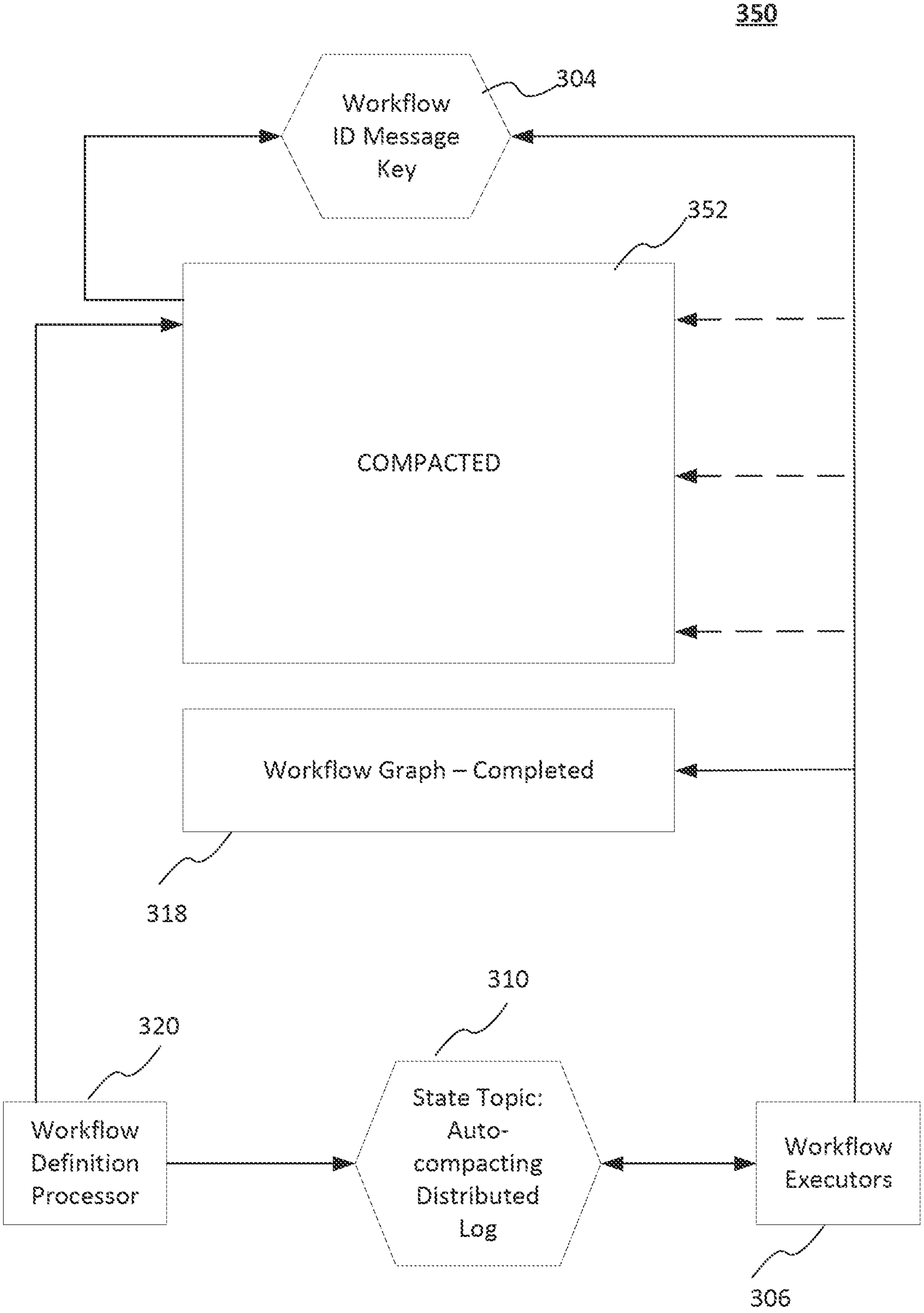
FIG. 3B shows an example workflow with compaction according to an implementation of the disclosed subject matter.

In some implementations, the distributed log storage may store a log topic that includes the changes of the internal workflow schema as steps are performed, where the log topic is without compaction, such as shown in FIG. 3A, described below.

In some implementations, the server may determine a run number for the internal workflow schema from the state topic to determine if the internal workflow schema for the key was completed. For example, the server may receive a request to perform the internal workflow schema based on the key and the determined run number. The compacting may reduce the states of the internal workflow schema to the current states of the run, without intermediary states of the internal workflow schema for the key in the distributed log storage.

Figure 2:
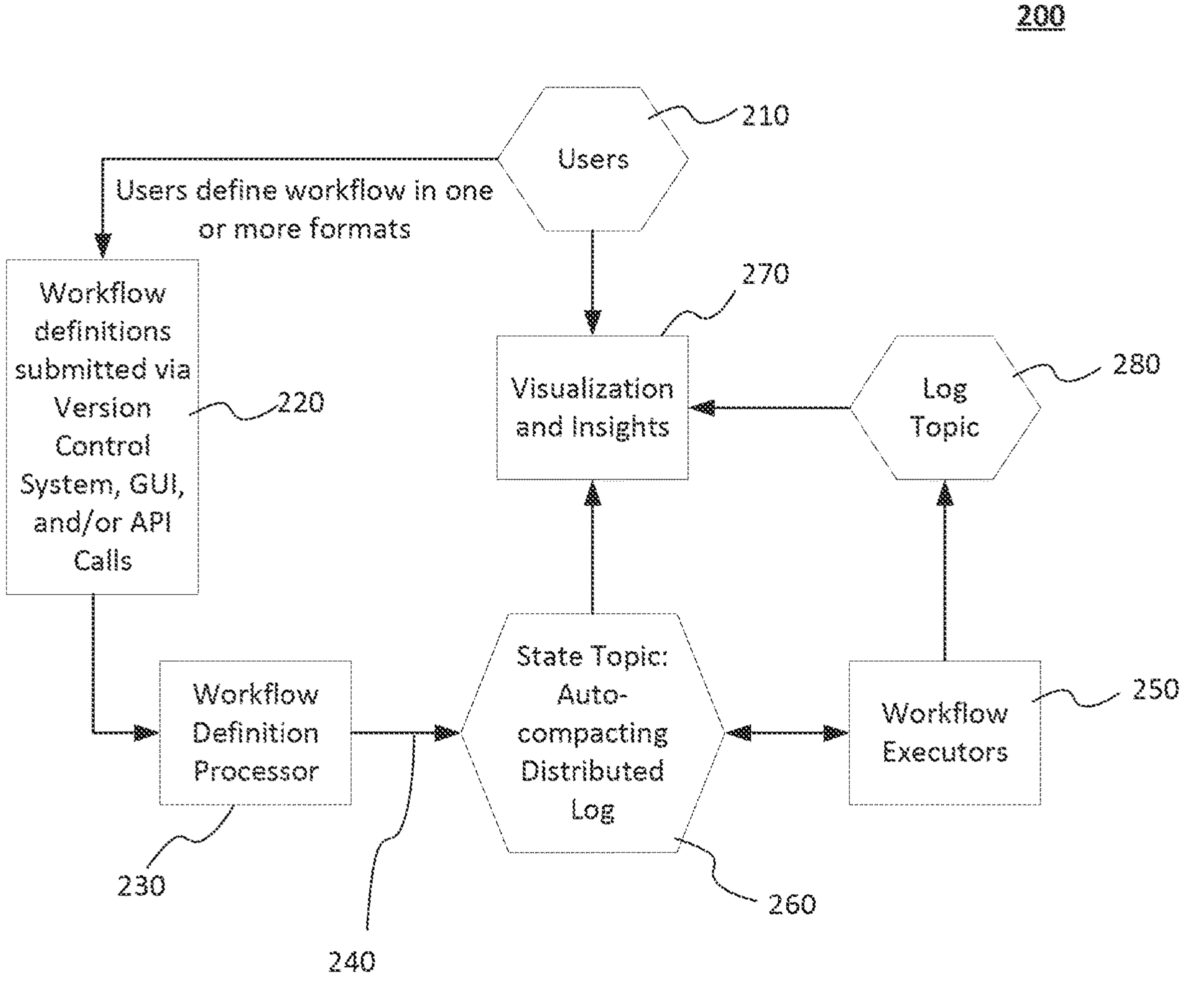
FIG. 2 shows a workflow of the example method of FIG. 1 according to an implementation of the disclosed subject matter.

FIG. 2 shows a workflow 200 of the example method 100 of FIG. 1 according to an implementation of the disclosed subject matter. Users 210 via computer 500 shown in FIG. 5 may define a workflow (i.e., a workflow definition). The workflow definition may be submitted at 220 by the users 210. For example, the workflow definition may be submitted via a version control system of the server 700 of FIG. 5, a graphical user interface of the computer 500 and/or the server 700, and/or an application program interface (API) of the server 700. That is, the computer 500 may transmit the workflow definition via the communication network 600 to the server 700.

The workflow definition processor 230, which may be part of server 700 shown in FIG. 5 may receive the workflow definition and may be optionally validated, as discussed above in connection with operation 110 of FIG. 1. The workflow definition processor may generate a unique key as described above in connection with operation 120 shown in FIG. 1, and may convert the workflow definition as described above in connection with operation 130 of FIG. 1. The converted workflow definition may be written at 240 to the distributed log 260 by the workflow definition processor 230. The distributed log 260 may be stored in the storage 710 and/or storage 720 shown in FIG. 5.

Workflow executors 250 may be workers of the server 700 which may determine (e.g., by polling or the like) whether a new message is available, such as described above in connection with operation 150 of FIG. 1. As described above in connection with operation 160, the worker (i.e., executor 250) may perform one or more operations based on the message. Workers (e.g., executors 250) may perform operations for a not-started state and provide messages back to the distributed log 260 for the same topic to change the state to in-progress. As described above in connection with operation 150 of FIG. 1, when the state of the received message is in-progress, the executor 250 may skip the message. When the state of the received message is an error state, the executor 250 may re-try performing the operation from which the error occurred. The state at the distributed log 260 may be changed to an in-progress state when the executor 250 retries performing the operation. When the state of the received message is completed, the executor 250 may skip the message, as another executor may be performing an operation in at least one operation for the internal workflow schema.

Visualization and insights 270 may output, transmit, and/or display at least one state of the internal workflow schema. For example, visualization and insights 270 may output, transmit, and/or display a current state (e.g., a not-started state, an in-progress state, and/or completed state, or the like) from server 700 to computer 500 for display on display 520.

Log topic 280 may be a topic (e.g., a partition of related data) that may be stored in storage 710 and/or storage 720 shown in FIG. 5 to which workflow executors (e.g., executors 250) may write to that report the operations and/or states of the internal workflow schema being performed by the executors 250. In contrast to the distributed log 260, there may be no compaction of the log topic 280. In some implementations, at least a portion of the log topic 280 may be transmitted from the server 700 to the computer 500 for display to a user. The user may view each of the operations performed by the executors 250 so that the user has a historical view of the operations, rather than a compacted view. For example, the non-started state 302, in-progress state 312, in-progress state 314, in-progress state 316, and/or completed state 318 shown in FIG. 3A that are not compacted may be included in the log topic 280.

FIG. 3A shows an example workflow 300 without compaction according to an implementation of the disclosed subject matter. The internal workflow schema having a not-started state 302 may be stored at a distributed log storage (e.g., storage 710 and/or storage 720 shown in FIG. 5) by the workflow definition processor 320 (which may be part of server 700 shown in FIG. 5), and the internal workflow schema may have a unique key, as described above in connection with operations 110, 120, 130, and 140 of FIG. 1 above.

A message including a state (i.e., not-started state) and the generated key may be output by the not-started state 302 which may be readable by a worker at the server (e.g., workflow executor 306), such as described above in connection with operation 150 of FIG. 1. The worker may perform at least one operation of the internal workflow schema such as in operation 160 of FIG. 1 as described above, and may update the status of the internal workflow schema (see, e.g., in-progress state 312, in-progress state 314, and in-progress state 316) such as described above in connection with operation 170 of FIG. 1 as the operations move towards completion (e.g., completed state 318).

The worker (e.g., the workflow executor 306) may write the state changes (e.g., in-progress state 312, in-progress state 314, and in-progress state 316, and/or completed state 318) to the distributed log 310 (e.g., storage 710 and/or storage 720 shown in FIG. 5). The workers may read one or more states of the internal workflow schema from the distributed log 310 to determine whether worker may perform one or more operations to advance the internal workflow schema towards completion. In the arrangement shown in FIG. 3A, the workers (e.g., workflow executors 306) may read a plurality of states of the internal workflow schema for a key from the distributed log 310 to determine the current state and whether additional operations may be performed for the internal workflow schema, as there is no compaction.

FIG. 3B shows an example workflow 350 with compaction according to an implementation of the disclosed subject matter. That is, example workflow 350 may be the workflow 300 of FIG. 3A that is compacted. The compaction operation may be similar to operation 180 described above in connection with FIG. 1, and may be further described in connection with FIGS. 4A-4B. The distributed log may compact the not-started state 302, the in-progress state 312, the in-progress state 314, and the in-progress state 316 into compacted state 352. The completed state 318 may be the last state change for the internal workflow schema stored in the distributed log 310, and which may be accessible by a worker (e.g., workflow executor 306) to determine the state of the internal workflow schema.

FIGS. 4A-4B show an example of compaction 400 according to an implementation of the disclosed subject matter. Log compaction, such as discussed above in connection with operation 180 of FIG. 1, may selectively remove records where there is the most recent update with the same primary key. Log compaction retains at least the last known value for each message key within the log for a single topic.

A distributed log topic 402, which may be similar to distributed log 260 of FIG. 2 and/or distributed log 310 shown in FIGS. 3A-3B, may include one or more messages written (e.g., stored to the distributed log topic based on a unique key generated for internal workflow schema. A first key 404 may be a unique key generated for a first internal workflow schema that has a not-started state 406, with an offset 408 of one (1). The offset may be a distance from a head (e.g., a beginning) of the distributed log topic 402. A second key 410 may be a unique key generated for a second internal workflow schema that has a not-started state 412, with an offset 414 of two (2). The distributed log topic 402 may include an in-progress state 418 for the first key 404 that has an offset 420 of three (3), an in-progress state 424 for the second key 410 with an offset of four (4), and a completed state 430 for the first key 404 with an offset 432 of five (5). When the distributed log topic 402 is compacted (e.g., by operation 180 of FIG. 1, discussed above), the in-progress state 424 for the second key 410 having the offset 426 of four (4) and the completed state 430 for the first key 404 with the offset 432 of five (5) may remain as the most current states for the first key and the second key, and the other states for the first key and the second key may be removed from the distributed log topic 402. The highest offset for each key may remain in the distributed log topic 402 after compaction.

Implementations of the presently disclosed subject matter may be implemented in and used with a variety of component and network architectures. FIG. 5 is an example computer 500 suitable for the implementations of the presently disclosed subject matter. As discussed in further detail herein, the computer 500 may be a single computer in a network of multiple computers. In some implementations, the computer 500 may be used to generate a workflow definition and/or display a current state (e.g., a not-started state, an in-progress state, and/or completed state, or the like). As shown in FIG. 5, the computer 500 may communicate with a server 700 (e.g., a server, cloud server, database, cluster, application server, neural network system, or the like) via a wired and/or wireless communications network 600. The server 700 may include a storage device 710, and/or may be communicatively coupled to storage device 720. The storage 710 and/or storage 720 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 and/or storage 720 may store data, such as a workflow definition, an internal workflow schema, states of the internal workflow schema, keys, the distributed log, and the like.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "converting," "storing," "performing," updating," "compacting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:

receiving, at a server, a workflow definition;

generating, at the server, a unique key for the received workflow definition;

converting, at the server, the received workflow definition to an internal workflow schema and setting states of workflow steps of the internal workflow schema as not-started states using the generated key;

storing, at a distributed log storage communicatively coupled to the server, the internal workflow schema having the not-started states to a state topic of the distributed log storage using the generated unique key, wherein the state topic includes the states of the internal workflow schema;

receiving, at the server, a message that includes a state based on one or more steps of the internal workflow schema;

performing, at the server with one or more workers, at least one operation based on the received message;

updating, at the distributed log storage, the state based on the performed at least one operation;

storing the at least one operation performed by the one or more workers and at least one state of the internal workflow schema based on the at least one operation performed as a log topic separately from the distributed log storage, wherein the at least one state is selected from a group consisting of: not-started, in-progress, error, and completed, and wherein the log topic is a partition of related data to which the one or more workers store the at least one state of the internal workflow schema being performed; and compacting, at the distributed log storage, the state topic of the internal workflow schema for the generated key based on the updated state, wherein the compacting reduces the states of the internal workflow schema to the current states without intermediary states, and wherein the stored operations of the log topic are separately stored from the distributed log storage without compaction.

2. The method of claim 1, further comprising:

validating, at the server, the received workflow definition.

3. The method of claim 1, further comprising:

determining, at the server, a run number for the internal workflow schema from the state topic to determine if the internal workflow schema for the key was completed.

4. The method of claim 3, further comprising:

receiving, at the server, a request to perform the internal workflow schema based on the key and the determined run number.

5. The method of claim 3, wherein the compacting reduces the states of the internal workflow schema to the current states of a run, without intermediary states of the internal workflow schema for the key in the distributed log storage.

6. The method of claim 1, wherein the internal workflow schema includes at least one workflow step selected from the group consisting of: a hold sequential workflow step, a parallel workflow step, and a nested workflow step.

7. The method of claim 1, wherein when the state of the received message is not-started, a worker of the server performs the at least one operation based on the received message.

8. The method of claim 1, wherein when the state of the received message is in-progress, a worker of the server skips the message.

9. The method of claim 1, wherein when the state of the received message is an error state, a worker of the server retries performing the operation from which the error occurred.

10. The method of claim 9, further comprising:

changing, at the at the distributed log storage, the state to an in-progress state when the worker retries performing the operation.

11. The method of claim 1, wherein when the at least one operation is completed by a worker, a completed state is written to the distributed log storage.

12. The method of claim 1, wherein when the state of the received message is completed, a worker of the server skips the message.

13. The method of claim 1, further comprising:

transmitting, at the server, the state topic of the internal workflow schema for display.

14. A system comprising:

a distributed log storage; and a server having a processor and a memory that are communicatively coupled to the distributed log storage, the server to:

receive a workflow definition;

generate a unique key for the received workflow definition;

convert the received workflow definition to an internal workflow schema and set states of workflow steps of the internal workflow schema as not-started states using the generated key;

store, at the distributed log storage, the internal workflow schema having the not-started states to a state topic of the distributed log storage using the generated unique key, wherein the state topic includes the states of the internal workflow schema;

receive a message that includes a state based on one or more steps of the internal workflow schema;

perform, with one or more workers at the server, at least one operation based on the received message;

update, at the distributed log storage, the state based on the performed at least one operation;

store the at least one operation performed by the one or more workers and at least one state of the internal workflow schema based on the at least one operation performed as a log topic separately from the distributed log storage, wherein the at least one state is selected from a group consisting of: not-started, in-progress, error, and completed, and wherein the log topic is a partition of related data to which the one or more workers store the at least one state of the internal workflow schema being performed; and compact, at the distributed log storage, the state topic of the internal workflow schema for the generated key based on the updated state, wherein the compacting reduces the states of the internal workflow schema to the current states without intermediary states, and wherein the stored operations of the log topic are separately stored from the distributed log storage without compaction.

15. The system of claim 14, wherein the server validates the received workflow definition.

16. The system of claim 14, wherein the internal workflow schema includes at least one workflow step selected from the group consisting of: a hold sequential workflow step, a parallel workflow step, and a nested workflow step.

17. The system of claim 14, wherein when the state of the received message is not-started, a worker of the server performs the at least one operation based on the received message.

18. The system of claim 14, wherein when the state of the received message is in-progress, a worker of the server skips the message.

19. The system of claim 14, wherein when the state of the received message is an error state, a worker of the server retries performing the operation from which the error occurred.

20. The system of claim 14, wherein when the at least one operation is completed by a worker, the server writes a completed state to the distributed log storage.

21. The system of claim 14, wherein the server transmits the state topic of the internal workflow schema for display.

* * * * *